US012693458B2

(12) United States Patent
Wang et al.

(10) Patent No.: US 12,693,458 B2
(45) Date of Patent: Jul. 28, 2026

(54) OPTICAL ELEMENT DRIVING MECHANISM

(71) Applicant: Actutek Corporation, Taoyuan City (TW)

(72) Inventors: Ying-Jen Wang, Taoyuan City (TW); Ya-Hsiu Wu, Taoyuan City (TW)

(73) Assignee: Actutek Corporation, Taoyuan City (TW)

( * ) Notice: Subject to any disclaimer, the term of this patent is extended or adjusted under 35 U.S.C. 154(b) by 205 days.

(21) Appl. No.: 18/628,025

(22) Filed: Apr. 5, 2024

(65) Prior Publication Data

US 2024/0337907 A1     Oct. 10, 2024

Related U.S. Application Data

(60) Provisional application No. 63/457,894, filed on Apr. 7, 2023.

(51) Int. Cl.

| | |
|---|---|
| *G02B 5/00* | (2006.01) |
| *G02B 7/02* | (2021.01) |
| *G02B 27/64* | (2006.01) |
| *G03B 7/26* | (2021.01) |
| *G03B 17/12* | (2021.01) |
| *G03B 17/56* | (2021.01) |

(52) U.S. Cl.
CPC ............... *G02B 5/005* (2013.01); *G02B 7/02* (2013.01); *G02B 27/646* (2013.01); *G03B 7/26* (2013.01); *G03B 17/12* (2013.01); *G03B 17/561* (2013.01); *G03B 17/565* (2013.01)

(58) Field of Classification Search
CPC ........ G02B 5/005; G02B 7/02; G02B 27/646; G02B 7/08; G02B 7/09; G03B 7/26; G03B 17/12; G03B 17/561; G03B 17/565; G03B 3/10; G03B 30/00; G03B 5/00; G03B 13/36
See application file for complete search history.

(56) References Cited

U.S. PATENT DOCUMENTS

| | | | | |
|---|---|---|---|---|
| 2019/0018258 A1* | 1/2019 | Minamisawa | ....... | H04N 23/687 |
| 2019/0018259 A1* | 1/2019 | Minamisawa | ........... | G03B 5/06 |
| 2019/0187255 A1* | 6/2019 | Jang | ....................... | G02B 7/021 |
| 2023/0336853 A1* | 10/2023 | Li | ............................ | G03B 5/00 |
| 2025/0044667 A1* | 2/2025 | Kim | ....................... | G03B 13/36 |

* cited by examiner

*Primary Examiner* — Abdelaaziz Tissire

(74) *Attorney, Agent, or Firm* — MUNCY, GEISSLER, OLDS & LOWE, P.C.

(57) ABSTRACT

An optical element driving mechanism is provided, which includes a first movable portion, a fixed portion, and a first driving assembly. The first movable portion is used for connecting to a first optical module having an optical axis. The first movable portion is movable relative to the fixed portion. The first driving assembly is used for driving the first movable portion to move relative to the fixed portion.

19 Claims, 8 Drawing Sheets

1000

1000

1320

1421

1512

1220

1150
1810

1211

1510

1520

1540

1410

1314

1310

1312

1413

1412

1311    1313    1431

OPTICAL ELEMENT DRIVING MECHANISM

CROSS REFERENCE TO RELATED APPLICATIONS

This application claims priority of U.S. Provisional Application No. 63/457,894, filed on Apr. 7, 2023, the entirety of which is incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include an optical system to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the optical system and how to increase its durability has become an important issue.

BRIEF SUMMARY OF THE INVENTION

An optical element driving mechanism is provided in some embodiments of the present disclosure, which includes a first movable portion, a fixed portion, and a first driving assembly. The first movable portion is used for connecting to a first optical module having an optical axis. The first movable portion is movable relative to the fixed portion. The first driving assembly is used for driving the first movable portion to move relative to the fixed portion.

In some embodiments, the first driving assembly does not overlap the first optical module when viewed in any direction perpendicular to the optical axis. The first driving assembly includes a first driving element for generating a first driving force, a first transmitting element used for transmitting the first driving force, and a first increasing element used for increasing the first driving force. The first driving element connects to the first transmitting element. The first driving element connects to the first increasing element. The first transmitting element is strip-shaped and extending in a direction parallel to the optical axis.

In some embodiments, the optical element driving mechanism further includes a first position sensing assembly used for detecting movement of the first movable portion, and a first circuit assembly electrically connected to the first sensing assembly. The first movable portion is polygonal. The first driving assembly and the first position sensing assembly are disposed on different sides of the first movable portion. The first position sensing assembly and the first driving assembly at least partially overlap each other in the direction perpendicular to the optical axis.

In some embodiments, the first driving assembly is at a first side of the first movable portion. The first position sensing assembly is at a second side of the first movable portion. The first positon sensing assembly includes a first sensing element and a first reference element.

In some embodiments, a connection which connects centers of the first sensing element and the first reference element is perpendicular to an extending direction of the second side when viewed along the optical axis.

In some embodiments, the first circuit assembly includes a movable portion fixing end at least partially affixed on the first movable portion, a fixed portion fixing end at least partially affixed on the fixed portion, and a resilient portion being resilient, and the movable portion fixing end is movably connected to the fixed portion fixing end through the resilient portion.

In some embodiments, the optical element driving mechanism further includes a second movable portion used for connecting to a second optical module, a second driving assembly used for driving the second movable portion to move, and a second circuit assembly electrically connected to the second driving assembly.

In some embodiments, the second movable portion is between a second circuit portion of the second circuit assembly and the first movable portion in the direction that the optical axis extends. The second circuit portion is plate-shaped and perpendicular to the optical axis. The first movable portion is between the fixed portion fixing end and the second movable portion. The first movable portion and the second movable portion are between the fixed portion fixing end and the second circuit portion when viewed in the direction perpendicular to the optical axis.

In some embodiments, the optical element further includes a third circuit assembly used for electrically connecting to an external circuit. The third circuit assembly includes a third circuit portion, wherein the third circuit portion is plate-shaped and parallel to the second circuit portion.

1 In some embodiments, the fixed portion fixing end is plate-shaped. The third circuit portion is parallel to the fixed portion fixing end. The fixed portion fixing end is between the second circuit portion and the third circuit portion when viewed in the direction perpendicular to the optical axis.

In some embodiments, the first driving assembly is electrically connected to the third circuit assembly. The third circuit portion and the fixed portion fixing end at least partially overlap each other in the direction that the optical axis extends.

In some embodiments, the third circuit portion and the second circuit portion at least partially overlap each other in the direction that the optical axis extends. The second circuit portion and the fixed portion fixing end at least partially overlap each other in the direction that the optical axis extends.

In some embodiments, the fixed portion includes a case having an opening corresponding to a light, a bottom, wherein a first accommodating space is formed between the case and the bottom and used for accommodating the second movable portion, and a first frame having a second accommodating space used for accommodating the second movable portion, and the second accommodating space is in the first accommodating space.

In some embodiments, the fixed portion has a third accommodating space. The second circuit portion is in the third accommodating space. The second circuit portion includes a first circuit surface and a second circuit surface. The first circuit surface is anti-reflective. The first circuit surface faces toward the opening. The reflectivity of the second circuit surface is higher than the reflectivity of the first circuit surface. The second circuit surface and the first circuit surface face different directions.

In some embodiments, the second circuit surface and the first circuit surface face opposite directions. The reflectivity of the first circuit surface is less than the reflectivity of a surface of the third circuit assembly. The reflectivity of the first circuit surface is less than the reflectivity of a surface of the first circuit assembly.

In some embodiments, the fixed portion further includes a second frame. The second movable portion is between a top surface of the second frame and the first frame.

In some embodiments, the case includes a first sidewall extending along the optical axis. The bottom includes a second sidewall extending along the optical axis. The first frame includes a third sidewall extending along the optical axis. A minimum distance between the third sidewall and a center of the second movable portion is less than a minimum distance between the first sidewall and the center of the second movable portion in the direction perpendicular to the optical axis. The third sidewall and the first sidewall at least partially overlap each other in the direction perpendicular to the optical axis.

In some embodiments, the minimum distance between the third sidewall and the center of the second movable portion is less than a minimum distance between the second sidewall and the center of the second movable portion in the direction perpendicular to the optical axis.

In some embodiments, the third sidewall and the second sidewall at least partially overlap each other in the direction perpendicular to the optical axis. The third sidewall and the first movable portion at least partially overlap each other in the direction perpendicular to the optical axis. The third sidewall and the second movable portion at least partially overlap each other in the direction perpendicular to the optical axis.

In some embodiments, the first driving assembly and the second driving assembly are disposed on an identical side of the fixed portion. The optical element driving mechanism further includes a third frame in the third accommodating space. The second driving assembly is at least partially between the second frame and the third frame.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
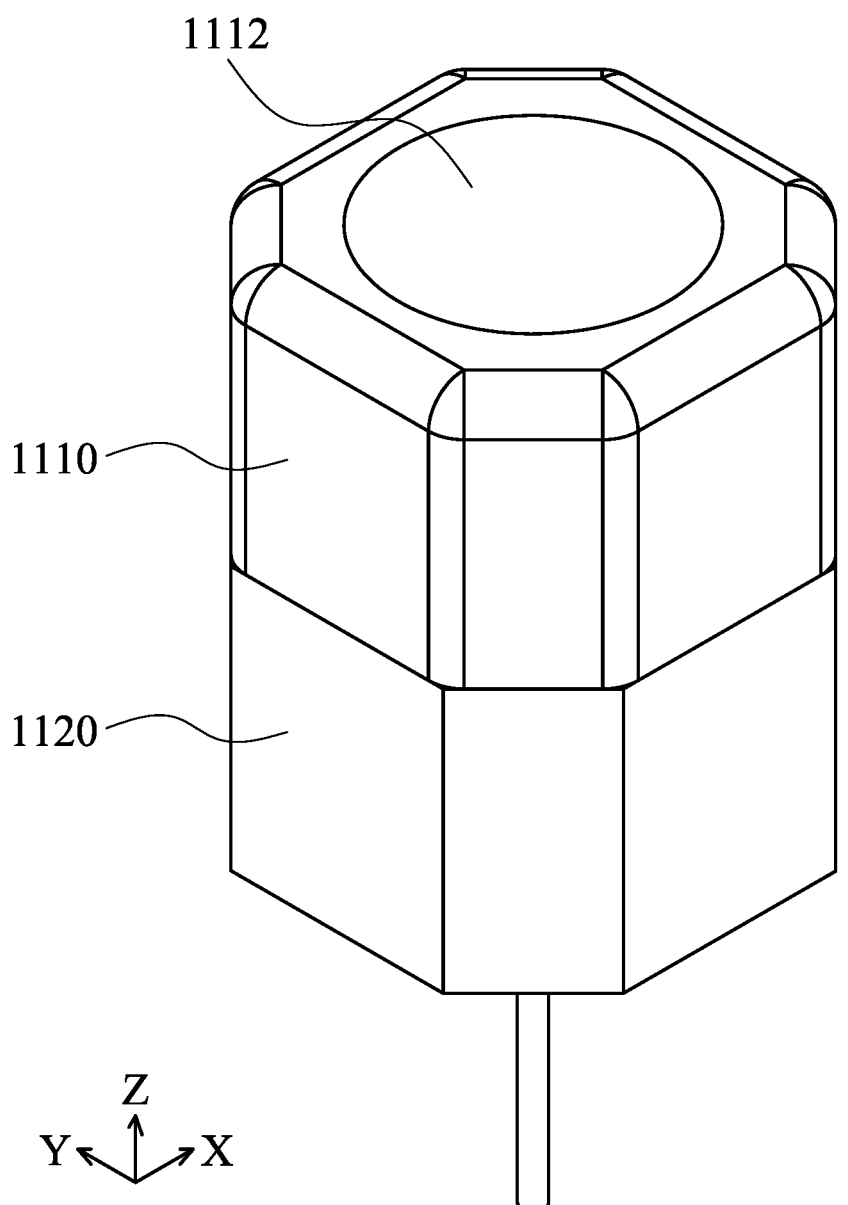
FIG. 1A is a schematic view of an optical element driving mechanism.

The following disclosure provides many different embodiments, or examples, for implementing different features of the provided subject matter. Specific examples of elements and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
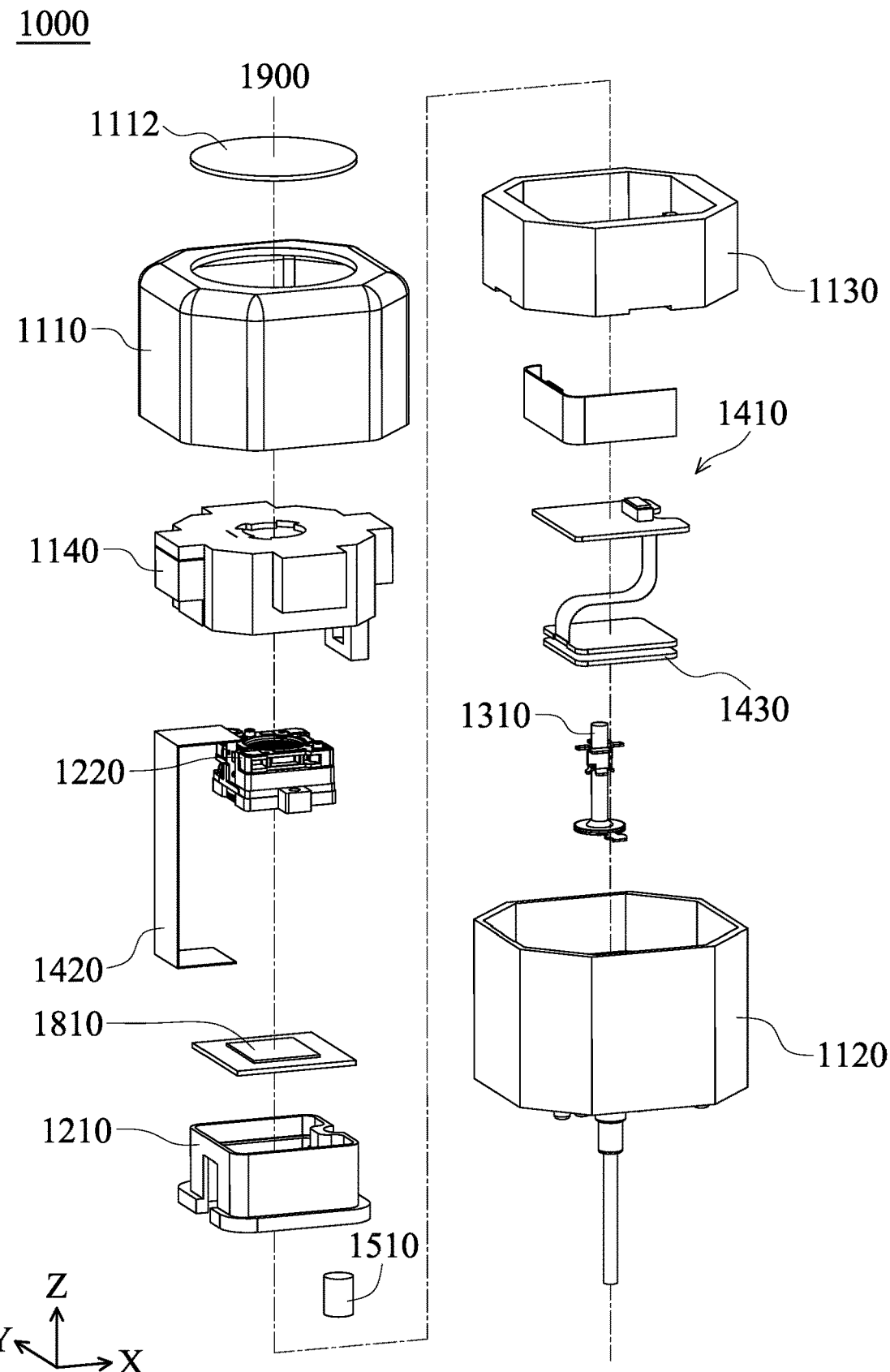
FIG. 1B is an exploded view of the optical element driving mechanism.
Figure 1C:
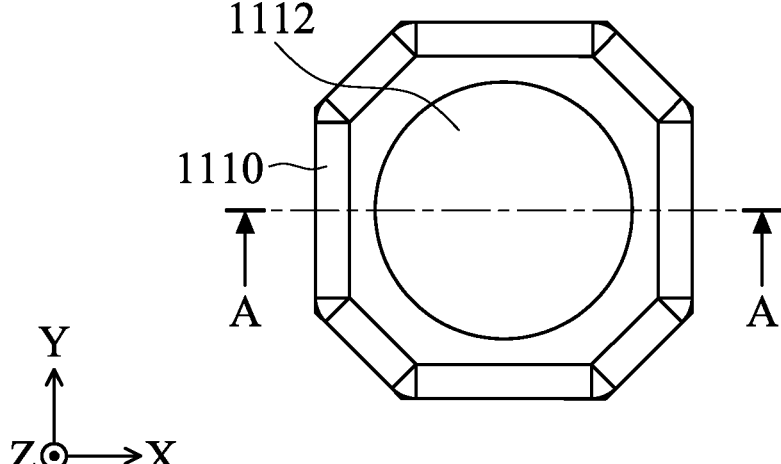
FIG. 1C is a top view of the optical element driving mechanism.
Figure 1D:
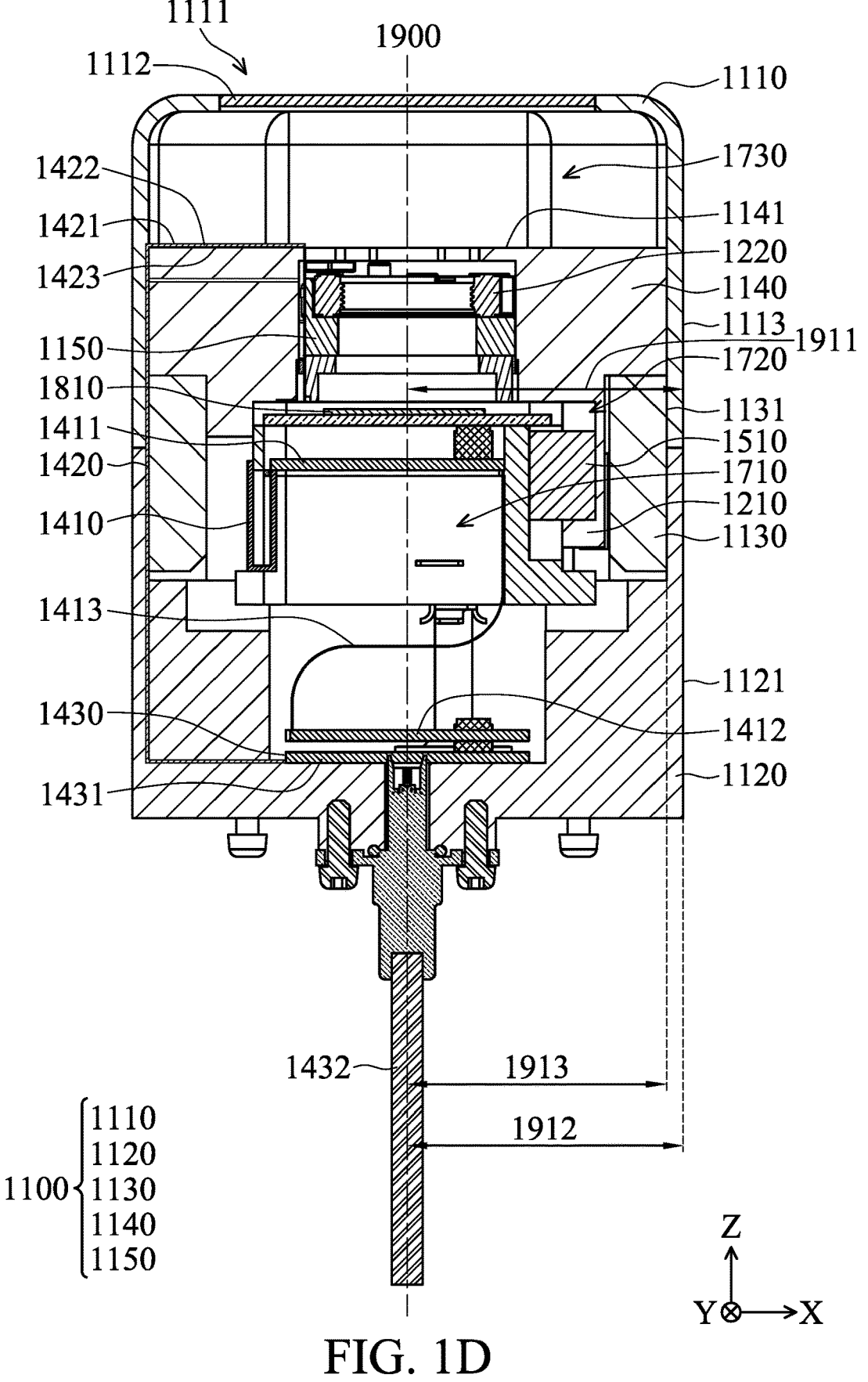
FIG. 1D is a cross-sectional view illustrated along the line A-A in FIG. 1C.

An optical element driving mechanism is provided in some embodiments of the present disclosure to drive an optical element to move. For example, FIG. 1A is a schematic view of an optical element driving mechanism 1000.
FIG. 1B is an exploded view of the optical element driving
mechanism 1000. FIG. 1C is a top view of the optical
element driving mechanism 1000. FIG. 1D is a cross-
sectional view illustrated along the line A-A in FIG. 1C.

As shown in FIG. 1A to FIG. 1D, the optical element
driving mechanism 1000 may mainly include a fixed portion
1100 (which includes a case 1110, a bottom 1120, a first
frame 1130, a second frame 1140, and a third frame 1150),
a protecting element 1112, a first movable portion 1210, a
second movable portion 1220, a first driving assembly 1310,
a first circuit assembly 1410, a second circuit assembly
1420, a third circuit assembly 1430, and a first intermediate
element 1510 arranged along a optical axis 1900 to drive a
first optical module 1810 and a second optical module (not
shown) to move.

In some embodiments, the case 1110, the bottom 1120, the
first frame 1130, the second frame 1140, and the third frame
1150 may be assembled and affixed with each other. For
example, as shown in FIG. 1D, the case 1110 and the bottom
1120 may combine with each other to form a first accom-
modating space 1710 to accommodate other elements of the
optical element driving mechanism 1000 (e.g. the first
movable portion 1210 and the second movable portion
1220). The first frame 1130 and the second frame 1140 may
combine with each other and be disposed in the case 1110
and the bottom 1120. The first frame 1130 may have a
second accommodating space 1720 for accommodating the
second movable portion 1220, and the second accommodat-
ing space 1720 is in the first accommodating space 1710.

In some embodiments, the second movable portion 1220
may be between a top surface 1141 of the second frame 1140
and the first frame 1130. The third frame 1150 may be
disposed in the second frame 1140. Moreover, the fixed
portion 1100 may further have a third accommodating space
1730, such as between the case 1110 and the first frame
1130, and the third frame 1150 may be disposed in the third
accommodating space 1730.

In some embodiments, the case 1110 may have an opening
1111 corresponding to a light, and the protecting element
1112 may be disposed in the opening 1111. The protecting
element 1112 may be transparent to allow external light
entering the optical element driving mechanism 1000
through the opening 1111 on the case 1110, and dust may be
prevented from entering the optical element driving mecha-
nism 1000 to protect the optical element driving mechanism
1000.

In some embodiments, the case 1110 may have a first
sidewall 1113, the bottom 1120 may have a second sidewall
1121, and the first frame 1130 may have a third sidewall
1131 extending along the optical axis 1900. In a direction
perpendicular to the optical axis 1900, a shortest distance
1913 between the third sidewall 1131 and a center of the first
movable portion 1210 is less than a shortest distance 1911
between the first sidewall 1113 and the center of the first
movable portion 1210, and less than a shortest distance 1912
between the second sidewall 1121 and the center of the first
movable portion 1210. The shortest distance 1911, the
shortest distance 1912, and the shortest distance 1913 may
be distances on a direction perpendicular to the optical axis
1900. Furthermore, the third sidewall 1131 at least partially
overlaps the first sidewall 1113, the second sidewall 1121,
the first movable portion 1210, and the second movable
portion 1220 in a direction perpendicular to the optical axis
1900.

In some embodiments, the first movable portion 1210 is
movably connected to the fixed portion 1100 and used for connecting the first optical module 1810. The second mov-
able portion 1220 is movably connected to the third frame
1150 and may be used for connecting to the second optical
module (not shown). In some embodiments, the first optical
module 1810 and the second optical module may be, for
example, a lens, a mirror, a prism, a reflective polished
surface, an optical coating, a beam splitter, an aperture, a
liquid lens, an image sensor, a camera module, or a ranging
module. It should be noted that the definition of the optical
element is not limited to the element that is related to visible
light, and other elements that relate to invisible light (e.g.
infrared or ultraviolet) are also included in the present
disclosure.

In some embodiments, the first circuit assembly 1410 may
be disposed between the case 1110 and the first movable
portion 1210, such as between the bottom 1120 and the first
movable portion 1210 for electrically connected to the first
optical module 1810 and external circuits. In some embodi-
ments, the second circuit assembly 1420 may be disposed on
the second movable portion 1220 to electrically connect to
the second driving assembly 1320 (shown in FIG. 2B) and
external circuits. In some embodiments, the first circuit
assembly 1410 and the second circuit assembly 1420 may
include printed circuit board (PCB) or flexible printed circuit
(FPC). In some embodiments, the conducting element 1432
may be disposed on the bottom 1120 and electrically con-
nected to the first circuit assembly 1410 to allow external
devices being electrically connected to the optical element
driving mechanism 1000.

In some embodiments, the first circuit assembly 1410 may
include a movable portion fixing end 1411, a fixed portion
fixing end 1412, and a resilient portion 1413. The movable
portion fixing end 1411 and the fixed portion fixing end 1412
may be plate-shaped. The movable portion fixing end 1411
may be at least partially affixed on the first movable portion
1210, and the fixed portion fixing end 1412 may be at least
partially affixed on the fixed portion 1100, such as connected
to the bottom 1120. The resilient portion 1413 is flexible,
and the movable portion fixing end 1411 may movably
connect to the fixed portion fixing end 1412 through the
resilient portion 1413, so the first circuit assembly 1410 may
electrically connect to the elements when the first movable
portion 1210 is moving relative to the fixed portion 1100.
The resilient portion 1413 may improve the anti-shake
function of the first movable portion 1210, and improve the
optical quality of the first optical module 1810. In some
embodiments the third circuit assembly 1430 may include a
third circuit portion 1431, the third circuit portion 1431 is
plate-shaped and parallel to the movable portion fixing end
1411 and the fixed portion fixing end 1412. The third circuit
portion 1431 may electrically connect the first circuit assem-
bly 1410 and the second circuit assembly 1420 to external
circuits.

Figure 2A:
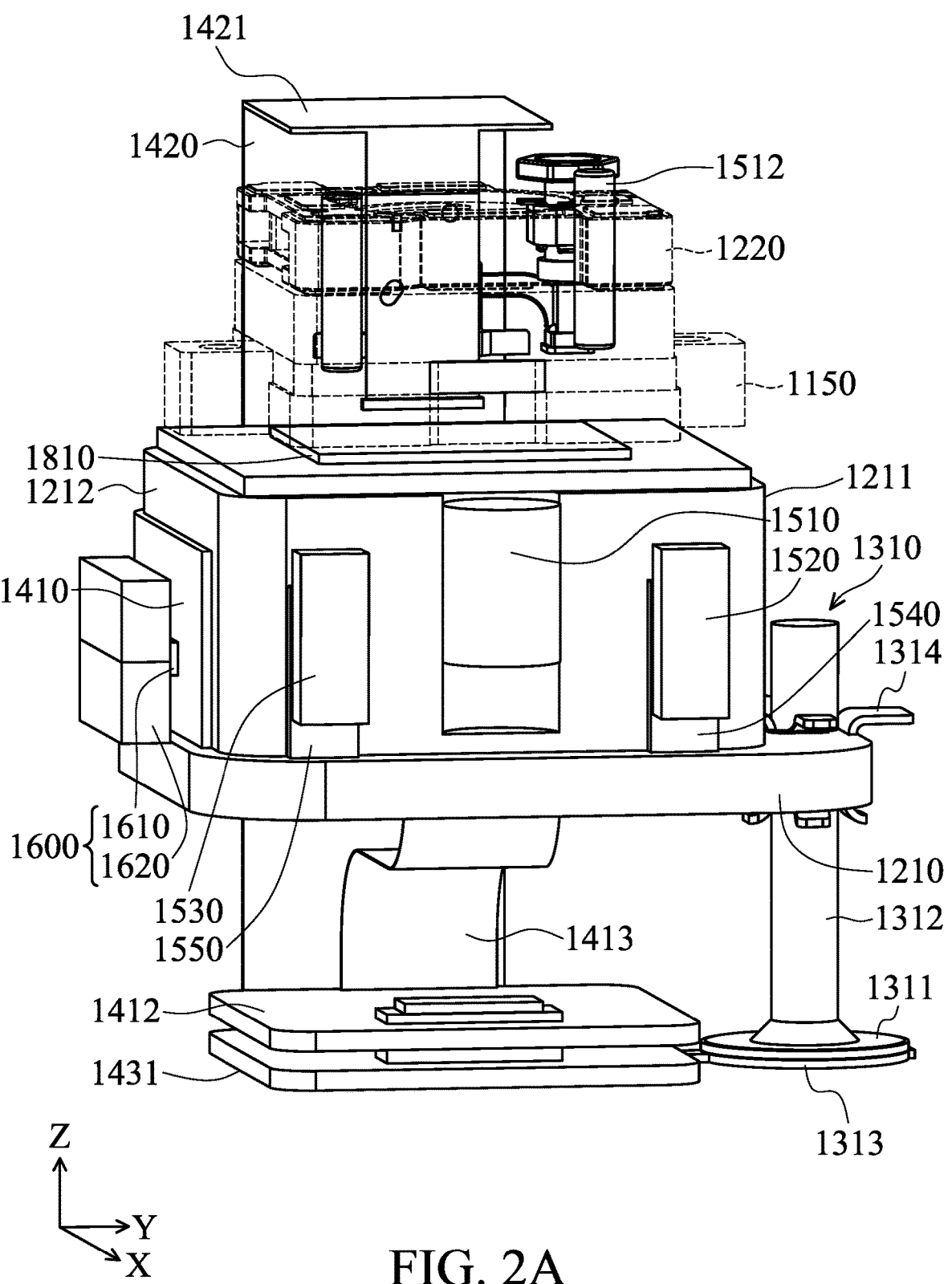
FIG. 2A is a schematic view of some elements of the optical element driving mechanism.
Figure 2B:
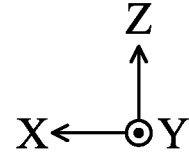
FIG. 2B and FIG. 2C are side views of some elements of the optical element driving mechanism when viewed in different directions.
Figure 2C:
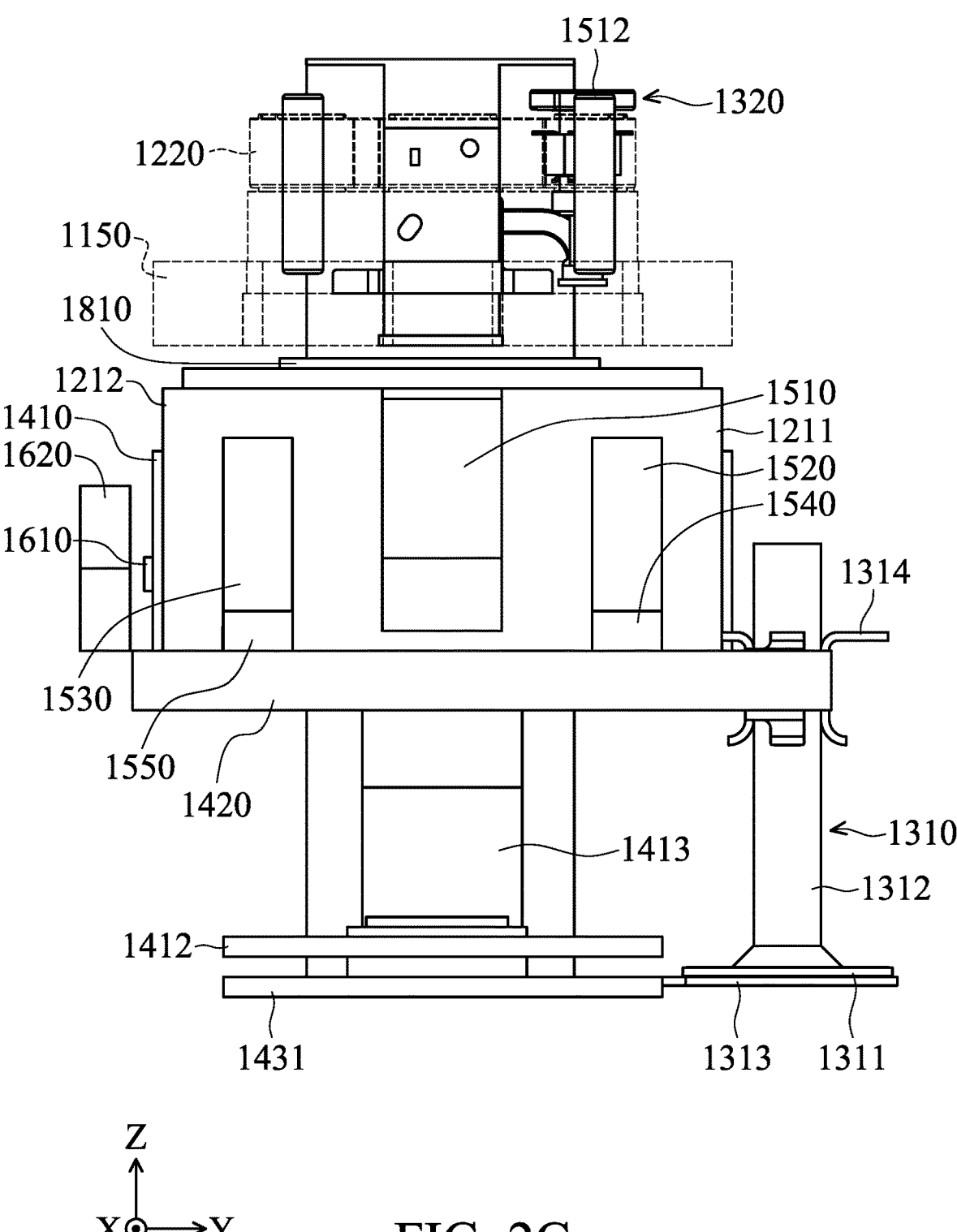
Figure 2D:
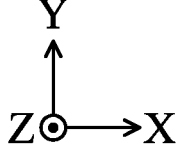
FIG. 2D is a top view of some elements of the optical element driving mechanism.

FIG. 2A is a schematic view of some elements of the
optical element driving mechanism 1000. FIG. 2B and FIG.
2C are side views of some elements of the optical element
driving mechanism 1000 when viewed in different direc-
tions. FIG. 2D is a top view of some elements of the optical
element driving mechanism 1000. As shown in FIG. 2A to
FIG. 2D, in some embodiments, the first driving assembly
1310 may be disposed between the fixed portion 1100 and
the first movable portion 1210 and electrically connected to
the first circuit assembly 1410 and the third circuit assembly
1430 for driving the first movable portion 1210 moving
relative to the fixed portion 1100. For example, the first
driving assembly 1310 may drive the first movable portion
1210 to move relative to the fixed portion 1100 in a direction parallel to the optical axis 1900 to achieve functions such as auto focus (AF) and zooming.

In some embodiments, the first driving assembly 1310 may include a first driving element 1311, a first transmitting element 1312, and a first increasing element 1313. The first driving element 1311 may be used for generating a first driving force, the first transmitting element 1312 may be used for transmitting the first driving force, and the first increasing element 1313 may be used for increasing the first driving force.

In particular, the first driving element 1311 may connect to the first transmitting element 1312 and the first increasing element 1313 and may include piezoelectric material. When current is provided to the first driving element 1311, the size of the first driving element 1311 in the Z axis may be changed to drive the first transmitting element 1312 moving along the Z axis. The first transmitting element 1312 may be strip-shaped and may extend in a direction parallel to the optical axis 1900, such as extend along the Z axis. The first increasing element 1313 may be electrically connected to the third circuit portion 1431 and the first driving element 1311 to allow providing current to the first driving element 1311 through the third circuit portion 1431 to drive the first driving element 1311.

In some embodiments, as shown in FIG. 2A to FIG. 2C, the first transmitting element 1312 may movably connect to the first movable portion 1210 through the first contact element 1314. In particular, the first contact element 1314 may be affixed on the first movable portion 1210 and may be in direct contact with the first transmitting element 1312, such as by friction contact. After overcoming the maximum static friction force between the first transmitting element 1312 and the first contact element 1314, the first transmitting element 1312 can move relative to the first contact element 1314. Therefore, the first movable portion 1210 may be moved in the Z axis. In some embodiments, the first transmitting element 1312 may include materials such as carbon fiber or Teflon, and the first contact element 1314 may include metal. In some embodiments, a support element (not shown) may be provided between the first transmitting element 1312 and the first movable portion 1210. The support element may be resilient, such as including rubber. Therefore, the first transmitting element 1312 may be in contact with the first contact element 1314 in a more stable way.

It should be noted that when viewed along any direction perpendicular to the optical axis 1900, the first driving assembly 1310 does not overlap the first optical module 1810. In other words, the first driving assembly 1310 and the first optical module 1810 are disposed on different positions in the Z axis to reduce the size of the optical element driving mechanism 1000 in any directions perpendicular to the optical axis 1900, and thus miniaturization may be achieved.

In some embodiments, as shown in FIG. 2A and FIG. 2C, the optical element driving mechanism 1000 may further include a first position sensing assembly 1600 disposed between the first movable portion 1210 and the fixed portion 1100 to detect the position of the first movable portion 1210 relative to the fixed portion 1100. In some embodiments, the first position sensing assembly 1600 may include a first sensing element 1610 and a first reference element 1620, the first sensing element 1610 may be disposed on the first movable portion 1210, such as disposed on the position of the first circuit assembly 1410 that connects to the first movable portion 1210, and may be electrically connected to the first circuit assembly 1410. The first reference element 1620 may be disposed on the fixed portion 1100, so when the first movable portion 1210 moves relative to the fixed portion 1100, the first sensing element 1610 may detect the magnetic field variation of the first reference element 1620 to get the position of the first movable portion 1210 relative to the fixed portion 1100.

In some embodiments, the first reference element 1620 may include magnetic elements such as magnet, and the first sensing element 1610 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the first movable portion 1210 may be polygonal, such as may have a first side 1211 and a second side 1212 opposite from each other, and the first driving assembly 1310 and the first position sensing assembly 1600 are disposed on the first side 1211 and the second side 1212, respectively. In other words, the first driving assembly 1310 and the first position sensing assembly 1600 are disposed on different sides of the first movable portion 1210 to further utilize the spaces in different sides. Moreover, as shown in FIG. 2D, in a direction perpendicular to the optical axis 1900 (e.g. the Y direction), the first position sensing assembly 1600 and the first driving assembly 1310 may at least partially overlap each other to reduce sizes of the optical element driving mechanism 1000 in other directions for achieving miniaturization. In some embodiments, when viewed along the optical axis 1900, a connection 1920 connecting centers of the first sensing element 1610 and the first reference element 1620 may be perpendicular to an extending direction of the second side 1212.

In some embodiments, as shown in FIG. 2A to FIG. 2D, the optical element driving mechanism 1000 may further include a second driving assembly 1320 disposed on the third frame 1150 and the second movable portion 1220 to drive the second movable portion 1220 and the second optical module disposed on the second movable portion 1220 to move relative the third frame 1150. In some embodiments, the first driving assembly 1310 and the second driving assembly 1320 may be disposed on an identical side of the fixed portion 1100, and the second driving assembly 1320 may be at least partially positioned between the second frame 1140 and the third frame 1150. In some embodiments, the second driving assembly 1320 may be similar to the first driving assembly 1310, such as including a driving element, a transmitting element, an increasing element, and a support element to drive the second movable portion 1220 and the second optical module disposed on the second movable portion 1220 moving in the Z axis by a similar way, so functions such as auto focus or zooming may be achieved. In some embodiments, the second driving assembly 1320 may be electrically connected to the second circuit assembly 1420. In some embodiments, as shown in FIG. 1D and FIG. 2A to FIG. 2D, the first movable portion 1210 may movably connect to the first frame 1130 through the first intermediate element 1510. For example, the first intermediate element 1510 may extend in the Z axis, may be affixed on one of the first movable portion 1210 and the first frame 1130, and may move relative to another one of the first movable portion 1210 and the first frame 1130 to define the moving direction of the first movable portion 1210 relative to the first frame 1130.

In some embodiments, the optical element driving mechanism 1000 may further include a first pressing element 1520, a second pressing element 1530, a first corresponding element 1540, and a second corresponding element 1550. The first pressing element 1520 and the second pressing element 1530 may be disposed on the first frame 1130, and the first corresponding element 1540 and the second corresponding element 1550 may be disposed on the first movable portion 1210. The first pressing element 1520 and the second pressing element 1530 may correspond to the first corresponding element 1540 and the second corresponding element 1550, respectively. For example, the first pressing element 1520 and the second pressing element 1530 may at least partially overlap the first corresponding element 1540 and the second corresponding element 1550 in the X axis when viewed along the optical axis 1900, respectively.

In some embodiments, the first pressing element 1520 and the second pressing element 1530 may generate a first stabilizing force and a second stabilizing force to make the first movable portion 1210 lean against the fixed portion 1100. For example, the first pressing element 1520 and the second pressing element 1530 may include magnets, and the first corresponding element 1540 and the second corresponding element 1550 may include magnetic elements, so the first pressing element 1520 and the second pressing element 1530 may generate attracting forces with the first corresponding element 1540 and the second corresponding element 1550 to allow the first movable portion 1210 lean against the fixed portion 1100. In some embodiments, as shown in FIG. 2A and FIG. 2C, the first intermediate element 1510 may be disposed between the first pressing element 1520 and the second pressing element 1530.

In some embodiments, as shown in FIG. 2A to FIG. 2D, the second movable portion 1220 may movably connect to the third frame 1150 through the second intermediate element 1512. For example, the second intermediate element 1512 may extending in the Z axis, may be affixed on one of the second movable portion 1220 and the third frame 1150, and may be movable relative to another one of the second movable portion 1220 and the third frame 1150 to define the moving direction of the second movable portion 1220 relative to the third frame 1150.

In some embodiments, as shown in FIG. 2A, FIG. 2B, and FIG. 2D, the second circuit assembly 1420 may include a second circuit portion 1421 which is plate-shaped, perpendicular to the optical axis 1900, and parallel to the third circuit portion 1431. In some embodiments, as shown in FIG. 1D, in a direction that the optical axis 1900 extends, the second movable portion 1220 may be between the second circuit portion 1421 and the first movable portion 1210, the first movable portion 1210 may be between the fixed portion fixing end 1412 and the second movable portion 1220, and the second circuit portion 1421 may be in the third accommodating space 1730.

Moreover, in the direction that the optical axis 1900 extends, the first movable portion 1210 and the second movable portion 1220 are disposed between the fixed portion fixing end 1412 and the second circuit portion 1421, and the fixed portion fixing end 1412 is between the second circuit portion 1421 and the third circuit portion 1431. In some embodiments, any two of the third circuit portion 1431, the second circuit portion 1421, and the fixed portion fixing end 1412 may overlap each other to reduce the size of the optical element driving mechanism 1000 in other directions, thereby achieving miniaturization.

In some embodiments, as shown in FIG. 1D, the second circuit portion 1421 may include a first circuit surface 1422 and a second circuit surface 1423, the first circuit surface 1422 may face the opening 1111 and may be anti-reflective. When external light entering the optical element driving mechanism 1000 through the opening 1111, the light will not be reflected if the light reaches the first circuit surface 1422, thereby preventing stray light. In some embodiments, the second circuit surface 1423 and the first circuit surface 1422 may face different directions, such as may face opposite directions. The first circuit surface 1422 and the second circuit surface 1423 may have different reflectivity, such as anti-reflection coating may be provided on the first circuit surface 1422 to change its reflectivity. In some embodiments, the reflectivity of the first circuit surface 1422 is less than the reflectivity of the second circuit surface 1423. Similarly, the reflectivity of the first circuit surface 1422 may also be less than the reflectivity of surfaces of the first circuit assembly 1410 and the third circuit assembly 1430.

In summary, an optical element driving mechanism is provided, which includes a first movable portion, a fixed portion, and a first driving assembly. The first movable portion is used for connecting to a first optical module having an optical axis. The first movable portion is movable relative to the fixed portion. The first driving assembly is used for driving the first movable portion to move relative to the fixed portion. Therefore, auto focus may be performed, the position of the movable portion may be stabilized, and miniaturization may be achieved.

The relative positions and size relationship of the elements in the present disclosure may allow the driving mechanism achieving miniaturization in specific directions or for the entire mechanism. Moreover, different optical modules may be combined with the driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
a first movable portion used for connecting a first optical module having an optical axis;
a fixed portion, wherein the first movable portion is movable relative to the fixed portion; and
a first driving assembly used for driving the first movable portion to move relative to the fixed portion, wherein the first driving assembly does not overlap the first optical module when viewed in any direction perpendicular to the optical axis, and the first driving assembly comprises:
a first driving element for generating a first driving force;

a first transmitting element used for transmitting the first driving force, wherein the first driving element connects to the first transmitting element, and the first transmitting element is strip-shaped and extending in a direction parallel to the optical axis; and a first increasing element used for increasing the first driving force, wherein the first driving element connects to the first increasing element.

2. The optical element driving mechanism as claimed in claim 1, further comprising:

a first position sensing assembly used for detecting movement of the first movable portion; and a first circuit assembly electrically connected to the first position sensing assembly;

the first movable portion is polygonal;

the first driving assembly and the first position sensing assembly are disposed on different sides of the first movable portion;

the first position sensing assembly and the first driving assembly at least partially overlap each other in the direction perpendicular to the optical axis.

3. The optical element driving mechanism as claimed in claim 2, wherein:

the first driving assembly is at a first side of the first movable portion;

the first position sensing assembly is at a second side of the first movable portion;

the first position sensing assembly comprises a first sensing element and a first reference element.

4. The optical element driving mechanism as claimed in claim 3, wherein a connection which connects centers of the first sensing element and the first reference element is perpendicular to an extending direction of the second side when viewed along the optical axis.

5. The optical element driving mechanism as claimed in claim 4, wherein the first circuit assembly comprises:

a movable portion fixing end at least partially affixed on the first movable portion;

a fixed portion fixing end at least partially affixed on the fixed portion; and a resilient portion being resilient, and the movable portion fixing end is movably connected to the fixed portion fixing end through the resilient portion.

6. The optical element driving mechanism as claimed in claim 5, further comprising:

a second movable portion used for connecting to a second optical module;

a second driving assembly used for driving the second movable portion to move; and a second circuit assembly electrically connected to the second driving assembly.

7. The optical element driving mechanism as claimed in claim 6, wherein:

the second movable portion is between a second circuit portion of the second circuit assembly and the first movable portion in the direction that the optical axis extends;

the second circuit portion is plate-shaped and perpendicular to the optical axis;

the first movable portion is between the fixed portion fixing end and the second movable portion;

the first movable portion and the second movable portion are between the fixed portion fixing end and the second circuit portion when viewed in the direction perpendicular to the optical axis.

8. The optical element driving mechanism as claimed in claim 7, further comprising a third circuit assembly used for electrically connecting to an external circuit, wherein:

the third circuit assembly comprises a third circuit portion, wherein the third circuit portion is plate-shaped and parallel to the second circuit portion.

9. The optical element driving mechanism as claimed in claim 8, wherein:

the fixed portion fixing end is plate-shaped;

the third circuit portion is parallel to the fixed portion fixing end;

the fixed portion fixing end is between the second circuit portion and the third circuit portion when viewed in the direction perpendicular to the optical axis.

10. The optical element driving mechanism as claimed in claim 9, wherein:

the first driving assembly is electrically connected to the third circuit assembly;

the third circuit portion and the fixed portion fixing end at least partially overlap each other in the direction that the optical axis extends.

11. The optical element driving mechanism as claimed in claim 10, wherein:

the third circuit portion and the second circuit portion at least partially overlap each other in the direction that the optical axis extends;

the second circuit portion and the fixed portion fixing end at least partially overlap each other in the direction that the optical axis extends.

12. The optical element driving mechanism as claimed in claim 11, wherein the fixed portion comprises:

a case having an opening corresponding to a light;

a bottom, wherein a first accommodating space is formed between the case and the bottom and used for accommodating the second movable portion; and a first frame having a second accommodating space used for accommodating the second movable portion, and the second accommodating space is in the first accommodating space.

13. The optical element driving mechanism as claimed in claim 12, wherein:

the fixed portion has a third accommodating space;

the second circuit portion is in the third accommodating space;

the second circuit portion comprises a first circuit surface and a second circuit surface;

the first circuit surface is anti-reflective;

the first circuit surface faces toward the opening;

the reflectivity of the second circuit surface is higher than the reflectivity of the first circuit surface;

the second circuit surface and the first circuit surface face different directions.

14. The optical element driving mechanism as claimed in claim 13, wherein:

the second circuit surface and the first circuit surface face opposite directions;

the reflectivity of the first circuit surface is less than the reflectivity of a surface of the third circuit assembly;

the reflectivity of the first circuit surface is less than the reflectivity of a surface of the first circuit assembly.

15. The optical element driving mechanism as claimed in claim 14, wherein:

the fixed portion further comprises a second frame;

the second movable portion is between a top surface of the second frame and the first frame.

16. The optical element driving mechanism as claimed in claim 13, wherein:

the case comprises a first sidewall extending along the optical axis;

the bottom comprises a second sidewall extending along the optical axis;

the first frame comprises a third sidewall extending along the optical axis;

a minimum distance between the third sidewall and a center of the second movable portion is less than a minimum distance between the first sidewall and the center of the second movable portion in the direction perpendicular to the optical axis;

the third sidewall and the first sidewall at least partially overlap each other in the direction perpendicular to the optical axis.

17. The optical element driving mechanism as claimed in claim 16, wherein the minimum distance between the third sidewall and the center of the second movable portion is less than a minimum distance between the second sidewall and the center of the second movable portion in the direction perpendicular to the optical axis.

18. The optical element driving mechanism as claimed in claim 17, wherein:

the third sidewall and the second sidewall at least partially overlap each other in the direction perpendicular to the optical axis;

the third sidewall and the first movable portion at least partially overlap each other in the direction perpendicular to the optical axis;

the third sidewall and the second movable portion at least partially overlap each other in the direction perpendicular to the optical axis.

19. The optical element driving mechanism as claimed in claim 18, wherein:

the first driving assembly and the second driving assembly are disposed on an identical side of the fixed portion;

the optical element driving mechanism further comprises a third frame in the third accommodating space;

the second driving assembly is at least partially between the second frame and the third frame.

* * * * *